US006680931B1

(12) United States Patent
Aigasa et al.

(10) Patent No.: US 6,680,931 B1
(45) Date of Patent: Jan. 20, 2004

(54) DATA MULTIPLEX BROADCASTING METHOD, DATA MULTIPLEX BROADCASTING SYSTEM, RECEIVING DEVICE, AND RECORDING DEVICE

(75) Inventors: Yuichi Aigasa, Kanagawa (JP); Yoshio Oomori, Kanagawa (JP)

(73) Assignee: Denon, Ltd., Tokyo (JP)

( * ) Notice: Subject to any disclaimer, the term of this patent is extended or adjusted under 35 U.S.C. 154(b) by 0 days.

(21) Appl. No.: 09/344,139

(22) Filed: Jun. 24, 1999

(30) Foreign Application Priority Data

Jun. 26, 1998 (JP) .......................................... 10-180514

(51) Int. Cl.[7] .................................................. H04J 3/24
(52) U.S. Cl. ....................................... 370/349; 370/529
(58) Field of Search ................................ 455/569, 12.1; 375/341; 370/503, 480, 481, 482, 484, 486, 494

(56) References Cited

U.S. PATENT DOCUMENTS

| | | | | |
|---|---|---|---|---|
| 4,420,833 | A | | 12/1983 | Noirel |
| 4,630,134 | A | * | 12/1986 | Kanamaru |
| 4,807,231 | A | | 2/1989 | Sato |
| 5,497,372 | A | * | 3/1996 | Nankoh |
| 5,530,702 | A | * | 6/1996 | Palmer |
| 5,668,805 | A | * | 9/1997 | Yoshinobu |
| 5,867,776 | A | * | 2/1999 | Noda |
| 5,995,517 | A | * | 11/1999 | Tomida |
| 6,057,808 | A | * | 5/2000 | Tajima |
| 6,111,613 | A | * | 8/2000 | Sasano |

FOREIGN PATENT DOCUMENTS

| | | |
|---|---|---|
| DE | 32 29 296 A1 | 2/1984 |
| EP | 0 618 693 A1 | 10/1994 |
| JP | 08102922 | 4/1996 |

* cited by examiner

*Primary Examiner*—Kwang Bin Yao
*Assistant Examiner*—Kamran Emdadi
(74) *Attorney, Agent, or Firm*—Dickstein Shapiro Morin & Oshinsky LLP

(57) ABSTRACT

An object of the present invention is to make it easy to recognize a start point and an end point of each music piece, when a plurality of music pieces are broadcasted. A music piece broadcast end information bit, which is reversed in its logic when a broadcast of a music piece ends, is newly added to information to be multiplexed and transmitted.

5 Claims, 13 Drawing Sheets

DATA STRUCTURE OF F-PAD

DATA STRUCTURE OF RDS SIGNAL

DATA STRUCTURE OF RDS SIGNAL

FIG. 15(a)

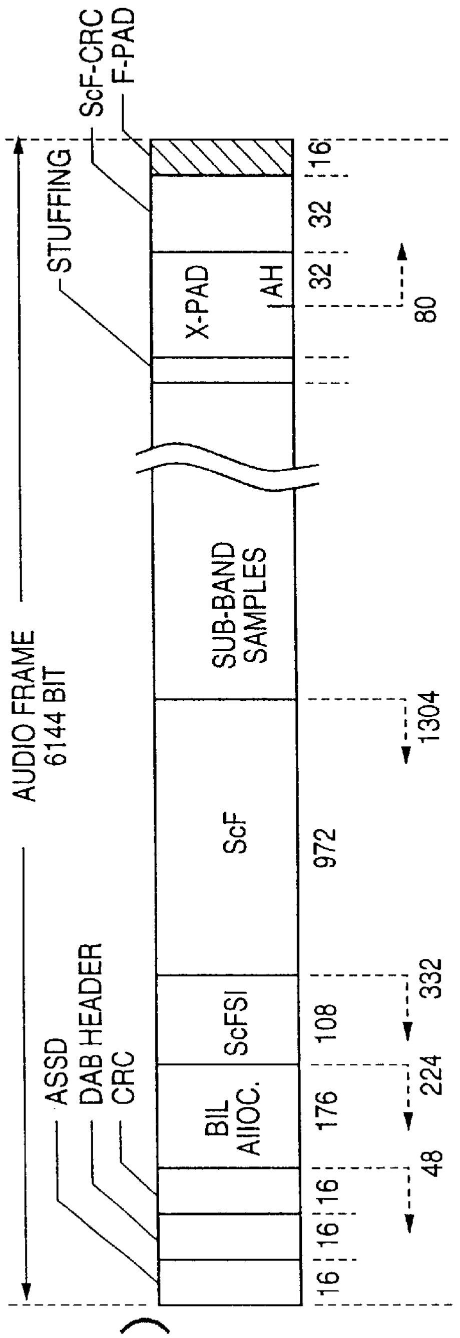

FIG. 15(b)

| | |
|---|---|
| HEADER | ASSD:AUDIO SERVICE SYNCHRONIZATION DATA<br>DAB header:DABHEADER<br>CRC :DAB header,Bit Allocation,CRC FOR ScFSI |
| SIDE INFORMATION | Bit Alloc:BIT ALLOCATION INFORMATION<br>ScFSI:SCALE FACTOR SELECT INFORMATION<br>ScFSI:SCALE FACTOR |
| MAIN AUDIO DATA | Sub-band sample:SUB-BAND SIGNAL |
| PROGRAMME ASSOCIATED INFORMATION | stuffing:STUFFING<br>ScF-CRC:CRC FOR SCALE FACTOR-CRC<br>X-PAD:EXTENDED PROGRAMME ASSOCIATED DATA<br>F-PAD:FIXED PROGRAM ASSOCIATED DATA |

DATA MULTIPLEX BROADCASTING METHOD, DATA MULTIPLEX BROADCASTING SYSTEM, RECEIVING DEVICE, AND RECORDING DEVICE

BACKGROUND OF THE INVENTION

1. Field of the Invention

The present invention relates to a data multiplex broadcasting system in which a plural kinds of data are multiplexed to be transmitted, and, in particular, to a data multiplex broadcasting system suitable for recognizing a start of broadcasting of a particular content on the receiving side.

2. Description of Related Art

In RDS (Radio Data System) and DAB (Digital Audio Broadcasting), programme-associated information or independent information is multiplexed into audio information to be broadcasted. In RDS and DAB, audio information is sent being multiplexed with information called M/S (Music/Speech) flag which indicates whether the content of the audio information in question belongs to the category of music or the category of speech. On the receiving side, by referring to this flag, it is easy to recognize a point of time at which a broadcast of a piece of music starts after speech of a speaker in a broadcast programme, for example. In other words, by referring to this M/S flag, it is easy to record a piece of music broadcasted during a broadcast programme, onto an audio recording device such as an MD (Mini Disk) recorder from the beginning of the music piece in question.

In the case of RDS, when a programme is broadcasted, information associated to the contents of the programme is subjected to multiplex modulation as RDS signal, and various services can be supplied to radio listeners based on the RDS signal demodulated on the receiving side.

This RDS signal is obtained by using a subcarrier of 57 kHz outside the frequency band of the FM-modulated wave, and by subjecting this subcarrier to amplitude modulation with coded information data signal associated to programme contents. This amplitude-modulated subcarrier is subjected to frequency modulation onto a main carrier and then broadcasted.

In FIG. 14, RDS signal is repeatedly multiplexed and transmitted by groups each of which consists of 104 bits. Each group consists of 4 blocks, and each block includes 26 bits. More particularly, the block consists of 16 bits of an information word and 10 bits of a check word.

Further, each group is classified into 16 types, Type 0 through Type 15, depending on its contents. In addition, for each type of group, one of two versions, A and B, is defined.

For example, 0A group is defined as basic tuning and switching information, and includes a programme identification code (PI code), a traffic-information-programme identification code (TP code), programme station code (PS code), and the like.

Information indicating whether contents of a broadcast belong to the category of music or the category of speech is included in a second block of 0A group, 0B group and 15B group, and a fourth block of 15B group. This information is called M/S (Music/Speech) flag, as described above. When the value of M/S flag is 0, it shows that the current broadcast contents belong to the category of "speech", and, when its value is 1, it shows the current broadcast contents belong to the category of "music". M/S flag is assigned, for example, to 13th bit 521 of the second block in FIG. 14.

On the receiving side, by receiving and demodulating this RDS signal, and by extracting M/S flag included in the 0A group, 0B group or 15B group, it is possible to recognize whether the current broadcast contents belong to the category of speech or to the category of music. Accordingly, by continuously monitoring this M/S flag, it is possible to recognize a point of time at which a broadcast of a piece of music starts after speech of a speaker in a broadcast programme, for example. Accordingly, it is possible to record apiece of music by an audio recording device such as an MD player, from the beginning of the music.

On the other hand, in the case of DAB, it is also possible to multiplex and transmit information similar to that in RDS. DAB is digital audio broadcasting in which Orthogonal Frequency Division Multiplex system (OFDM system) is employed to carry out multiplex modulation, and audio information is encoded in accordance with MPEG Layer II (International Standard system ISO/IEC 11172-3 Layer II).

In FIG. 15, an audio frame of DAB has a frame length of 24 ms, and is slightly different from a frame of MPEG. PAD (Programme Associated Data) included in this audio frame is for transmitting information associated with the programme. Utilizing this PAD, it is possible to transmit information such as a programme name, a record number, dynamic range control information, and the like. Further, PAD includes M/S (Music/Speech) flag that indicates whether broadcast contents belong to the category of music or the category of speech.

Accordingly, in the case of DAB, by extracting PAD included in an audio frame and referring to the content of M/S flag included in PAD, on the receiving side, it is also possible to recognize a point of time at which a broadcast of a piece of music starts after speech of a speaker, for example, similarly to RDS. Thus, it is possible to record a piece of music from the beginning by an audio recording device such as an MD player.

SUMMARY OF THE INVENTION

As described above, M/S flag indicates whether broadcast contents on the air belong to the category of music or the category of speech. In other words, it is a flag showing a category of broadcast contents on the air. However, use of M/S flag causes following problems in record control in an audio recording device such as an MD player.

Namely, when a plurality of music pieces are successively broadcasted, and it is desired to record a particular music piece out of these music pieces, the record control using M/S flag is not applicable to that situation. Accordingly, an operator must start a recording operation on the audio recording device in a timing synchronized a point of time at which that particular piece of music is actually started to be broadcasted. On that occasion, if the recording operation deviates from the actual point of time when the broadcast of the music piece is started to be transmitted, it is probable that failure such as so-called "headless" may be caused.

Further, as described above, even if plural pieces of music are to be successively broadcasted immediately after speech in a broadcast, it is possible to utilize M/S flag for automatic start of recording in synchronization with start of broadcasting the first piece of music. However, it is impossible to automatically stop recording operation in synchronization with a start of broadcast of a music piece next to the first-broadcasted one. In other words, it is impossible to record only the first music piece. Accordingly, an operator must stop recording of the audio recording device in synchronization with an actual end of broadcasting of the music piece which is being recorded.

The present invention has been made taking the above situation into consideration. An object of the present invention is to make it possible to easily recognize divisional point of respective content elements on the receiving side, even when the content elements of the same category are successively broadcasted. In detail, an object of the present invention is to provide a data multiplex broadcasting method, a switcher, a data multiplex transmitting device, a receiving device, a system controller, and a recording device which are able to support easy recognition of divisional point of respective content elements on the receiving side when the content elements of the same category are successively broadcasted.

To attain the above object, in the data multiplex broadcasting method of the present invention, information which can specify a start or end of each content element is multiplexed to data expressing broadcast contents and broadcasted when each content element of the broadcast contents belongs to the same category.

In detail, in the case that broadcast data expressing broadcast contents is formed of a plurality of successive element data, each of which expresses a content element belonging to the same category, a code whose state changes in synchronism with a start and/or end of each element data which is a constituent of said broadcast data is multiplexed to said broadcast data to be broadcasted.

Or, in the case that broadcast data expressing broadcast contents is formed of a plurality of successive element data, each of which expresses a content element belonging to the same category, a code expressing the number of element data which have been already transmitted or have not been transmitted yet among the element data which constitute the broadcast data is multiplexed to said broadcast data, in synchronism with a start or end of each of the element data constituting the broadcast data.

Or, a code, whose state changes in synchronism with switching of input sources of broadcast data expressing broadcast contents, is multiplexed to said broadcast data to be broadcasted.

Further, to attain the above objects, a switcher of the present invention generates information that can specify switching of input lines, i.e., switching of the content elements, in the case that the input lines are switched thereby to include a plurality of content elements into broadcast data expressing broadcast contents.

In detail, the switcher comprises: an input interface means for receiving element data through a plurality of lines; a line selection means for selecting element data of some one line out of the element data received by said input interface means through a plurality of lines and for generating a code when the selected line is changed, said code changing its state in synchronism with said change of the selected line; and an output interface means for transmitting the element data selected by and the code generated by said line selection means.

Further, to attain the above objects, a source controller of the present invention generates information that can specify switching of the information output devices, i.e., switching of the content elements, when a plurality of information output devices are controlled in their starts of output thereby to include a plurality of content elements into broadcast data expressing broadcast contents.

In detail, the source controller comprises: a control means for controlling a plurality of information output devices, at least concerning their starting of output; a switching means for selecting some one out of said plurality of information output devices; and a signal generating means for outputting a signal whose state changes in synchronism with a point of time at which said switching means switches the information output device to be selected.

Or, the source controller comprises: a control means for controlling a plurality of information output devices, at least concerning their starting of output; a switching means for selecting some one out of said plurality of information output devices; and a signal generating means for deciding a content of associated information associated to information of a content element outputted by the information output device after switched, said associated information including a code whose state changes in synchronism with a point of time of switching the information output device to be selected, and for generating a signal indicating said decided content.

Further, to attain the above objects, a data multiplex system of the present invention generates information that can specify switching of the information output device performing output, i.e., switching of content elements, and multiplexes said information into the broadcast data to broadcast the multiplexed data, when a plurality of information output devices are controlled concerning their respective starting of output thereby to include a plurality of content elements into broadcast data expressing broadcast contents.

In detail, the data multiplex system comprises: a plurality of information output devices; the above-described source controller; a programme configuration information generating means for generating programme configuration information in accordance with the content indicated by the signal supplied from the source controller; an encoding means for receiving information of the content element outputted by the information output device selected by the source controller and for encoding the received information; a multiplexing means for multiplexing the information of the content element encoded by the encoding means and the programme configuration information generated by the programme configuration information generating means, and for generating a multiplex signal; a modulating means for modulating the multiplex signal generated by the multiplexing means; and a transmitting means for broadcasting the multiplex signal modulated by the modulating means.

Further, to attain the above objects, the receiving device of the present invention monitors information that can specify switching of respective content elements included in the broadcast data and that is multiplexed to the multiplex signal broadcasted by the data multiplex system, so as to detect points at which respective content elements are switched.

In detail, the receiving device comprises: an extracting means for extracting a music piece broadcast end bit and an M/S flag multiplexed into the broadcast data, as the information that can specify switching of respective content elements included in the broadcast data, said music piece broadcast end bit being reversed in its logic in synchronism with an end of the music piece broadcasted, and the M/S flag indicating music or speech; and an outputting means for outputting a signal indicating a divisional point between music pieces in synchronism with a point of time at which the music piece broadcast end bit is reversed in its logic, in a state that the M/S flag indicates music.

Or, the receiving device comprises: an extracting means for extracting an information bit indicating a number of remaining music pieces to be broadcasted and an M/S flag indicating music or speech, the information bit and M/S flag being multiplexed into broadcast data, as information that can specify switching of respective content elements included in the broadcast data; and a signal generating means for generating a signal that indicates a value indicated by the information bit when the M/S flag indicates music.

Further, to attain the above-described objects, the system controller of the present invention utilizes the points of switching content elements (music pieces) detected by said receiving device, so as to make a recording device to record a desired content element.

In detail, the system controller comprises: an interface for receiving operator's designation of an ordinal number corresponding to a music piece to be recorded; and a control part for causing the recording device to start to record when the receiving device detects a point of starting broadcast of the music piece corresponding to said designated ordinal number.

Further, to attain the above-described objects, the recording device of the present invention can record only desired content elements by monitoring the information that can specify switching of respective content elements included in the broadcast data and is multiplexed in the multiplex signal transmitted by the above-described data multiplex system, so as to detect the points of switching respective content elements.

In detail, the recording device comprises: a recording means for recording broadcast data; an interface means for receiving an instruction to start recording; an extracting means for extracting broadcast data expressing broadcast contents and a divisional point signal for contents element data expressing respective content elements constituting the broadcast data, from the multiplex signal received; a buffer memory means for storing said extracted broadcast data and divisional point signal over a certain period; a detecting means for detecting a point at which a state of the divisional point signal stored in the buffer memory means changes; and a transfer means for supplying the broadcast data stored in the buffer memory means when and after the state of the detected divisional point signal changed, when the instruction is received by the interface means.

BRIEF DESCRIPTION OF THE DRAWINGS

FIG. 15 is an explanatory view showing structure of an audio frame of DAB.

DETAILED DESCRIPTION OF THE PREFERRED EMBODIMENTS

Figure 1:
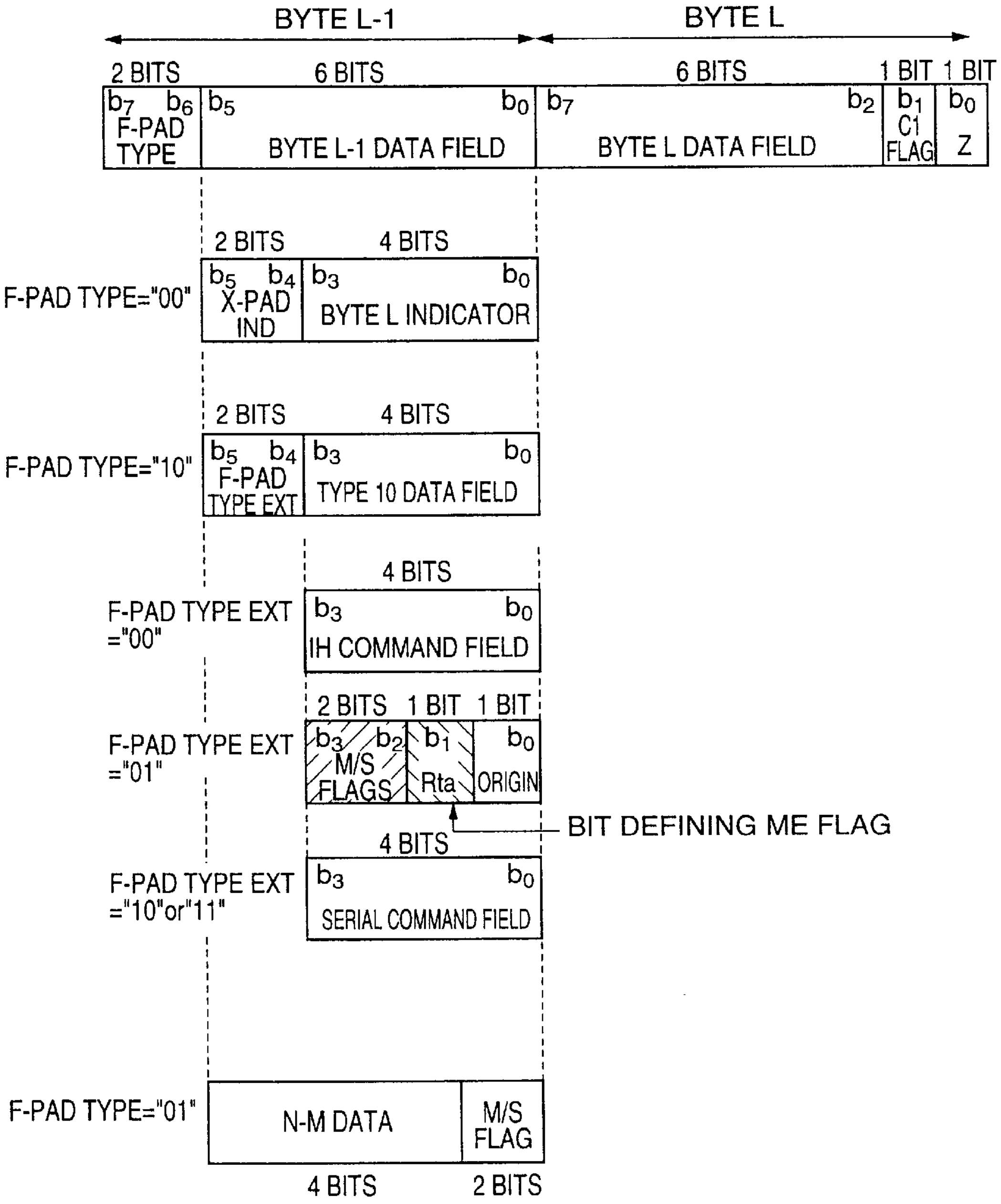
FIG. 1 is an explanatory view showing structure of PAD included in an audio frame of DAB.

Now, embodiments of the present invention will be described referring to the drawings.

First, referring to FIGS. 1–6, there will be described a first embodiment of the present invention.

In a data multiplex broadcasting system to which the present embodiment is applied, information bits indicating divisional points between content elements constituting broadcast contents are multiplexed to broadcast data expressing the broadcast contents, to be broadcasted. These information bits may change their states in accordance with starts and ends of respective content -elements, or may change their states at the divisional points between the content elements.

In the following, description will be given mainly with respect to information bits that change their states in such a manner that their bit logic is reversed at divisional points between music pieces when the content elements are pieces of music. Here, the content elements are not necessarily restricted to music pieces, and may be some collection of contents which become elements constituting a programme. Further, the divisional points are suitable as long as they are divisional points in the time domain, and, for example, they may be timing for switching information output devices that become sources of broadcast contents.

In one mode of the data multiplex broadcasting system, a music-piece-broadcasting end information bit (Music End flag, referred to as "ME flag" in the following), whose logic is reversed when broadcast of music pieces is ended, is added to the information which is multiplexed to be transmitted.

For example, to apply the present data multiplex broadcasting system to DAB, an undefined bit existing in a PAD domain in which M/S flag is included may be assigned to ME flag. In detail, as shown in FIG. 1, ME flag is defined at b1 bit, an undefined bit (Rfa; Reserved for Future Addition), of F-PAD ext in which M/S flag is included.

Figure 2:
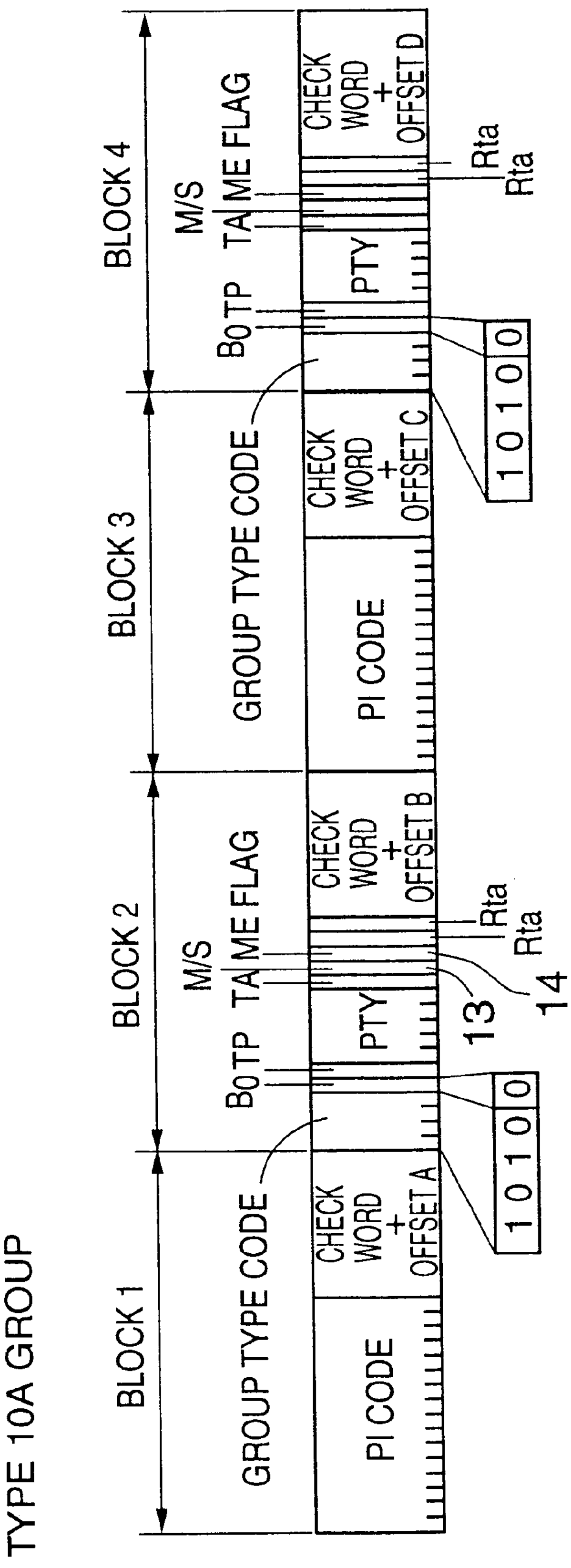
FIG. 2 is an explanatory view showing data structure of RDS signal, to which a first embodiment of the present invention is applied.

Further, to apply the present data multiplex broadcasting system to RDS, ME flag may be multiplexed and transmitted, being defined within an undefined group such as the type 10 group, for example. In detail, as shown in FIG. 2, ME flag may be defined at 14th bit of the block 2 or the block 4 in the type 10 group.

As described above, information bit (ME flag) indicating an end of each of the content elements such as each of the music pieces can be multiplexed to an ordinary broadcast, i.e., broadcast data expressing broadcast contents, to be broadcasted.

Accordingly, a receiver which is able to receive the information multiplexed to and transmitted with an ordinary broadcast can recognize a point of time when a broadcasted music piece ends, by demodulating multiplexed information and, thereafter, extracting the above-described ME flag and recognizing the content of ME flag. A point of time when the broadcast contents are switched from speech to a music piece can be detected from the above-mentioned M/S flag. In the case that plural pieces of music are successively broadcasted, ME flag is utilized to recognize an end point of a music piece, and, at the same time, to recognize a start point of the next music piece to be broadcasted.

By transferring this information, via control bus, to an audio recording device connected to the receiver, the audio recording device can recognize a point of time at which a broadcast of the music piece is started.

Thus, when a user prearranges recording of a music piece in advance in a stage before start of broadcasting a music piece, for example, in a stage that the music piece is introduced, it is possible that the audio recording device automatically starts recording at the moment that it recognizes the point of time at which the music piece requested by the user starts to be broadcasted, and automatically finishes the recording at the moment that it recognizes the point of time at which the broadcast of the music piece ends.

Next, referring to FIG. 3, there will be described a transmission system for this data multiplex broadcasting system. Although a transmission system applied to DAB is described here, it, of course, can also be applied to other standards, such as RDS for example.

Figure 3:
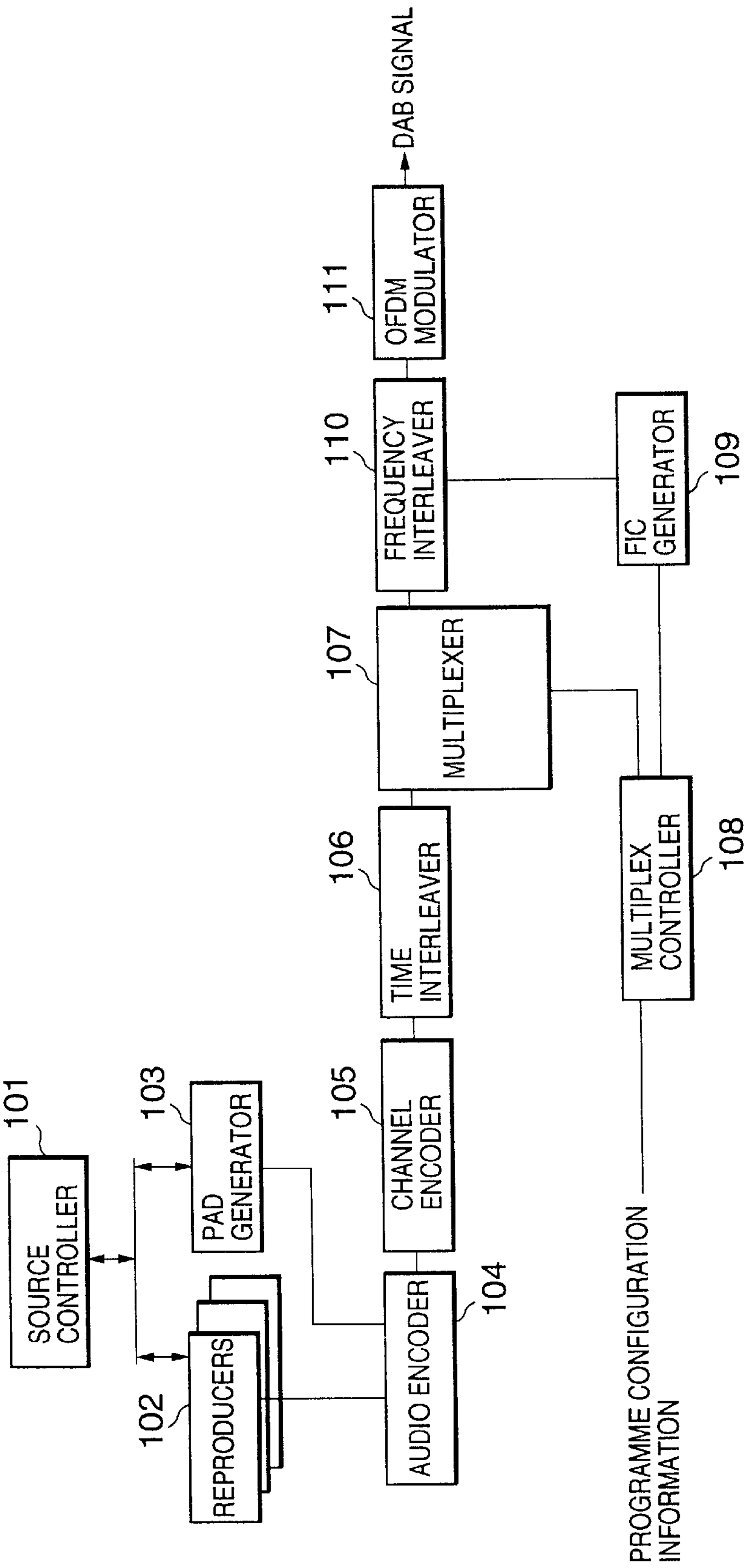
FIG. 3 is a block diagram showing a transmission system to which the first embodiment of the present invention is applied.

In FIG. 3, a transmission system of DAB comprises a source controller 101, a plurality of reproducers 102 serving as information output devices (source players), a PAD generator 103, an audio encoder 104, a channel encoder 105, a time interleaver 106, a multiplexer 107, a multiplex controller 108, an FIC generator 109, a frequency interleaver 110, and an OFDM modulator 111.

The above-mentioned source controller 101 controls the reproducers 102 such as a CD player and an MD player depending on broadcast contents, so as to output broadcast signal to the audio encoder 104, and decides the contents of PAD constructed depending on the broadcast signal to transfer information to a PAD generator 103.

When the source controller 101 controls the reproducers 102 to change a music piece to be broadcasted, the source controller 101 transfers information indicating that the music piece is changed to the PAD generator 103. In response, the above-mentioned ME flag is reversed in its logic to build in PAD by the PAD generator 103. As a matter of course, when the reproducers 102 are in an ordinary reproducing state, ME flag builds in PAD without being reversed in its logic.

Audio signal reproduced in the reproducers 102 is processed in the audio encoder 104, the channel encoder 105, and the time interleaver 106, and transferred to the multiplexer 107. Programme associated information to be multiplexed to the audio signal is generated by the PAD generator 103, and inputted into the audio encoder 104 similarly to the audio signal to be added to it. Further, programme associated information passes through the multiplex controller 108 and might be multiplexed to the audio signal according to its contents, but it is usually constructed as FIC (Fast Information Channel) in the FIC generator 109. This FIC is added to the audio signal, and thereafter, is subjected to frequency interleave in the frequency interleaver 110, and is subject to OFDM modulation in the OFDM modulator 111 to be DAB transmission signal.

Next, referring to FIG. 4, there will be described an example of contents of M/S flag and ME flag in the case that three pieces of music, A, B and C are successively broadcasted after speaker's speech in a DAB sound programme.

In DAB system, it is defined that M/S flag is “10” when broadcast contents are speech and “01” for music. When M/S flag is “00”, it indicates that information of M/S flag is not being sent, and “11” is reserved for future change in DAB system. ME flag of the present invention has no meaning in its value itself. However, it is defined that ME flag is reversed in its logic when a broadcast of a music piece is ended and another music piece is broadcasted or broadcast contents are changed to speech.

When speaker's speech is on the air, M/S flag is “10”, so that the broadcast contents can be recognized as speech. The logic of ME flag has no meaning in itself, and is assumed to be “0” here.

When the speaker's speech ends and broadcast of the music piece A starts, M/S flag changes from “10” to “01”, so that it is possible to recognize that the broadcast contents change to a music piece.

Further, when the music piece A is switched to the music piece B, ME flag is reversed from “0” to “1”. Thus, it is possible to recognize that the broadcast of the music piece A ends, and that broadcast of the music piece B starts since M/S flag remains “01”.

Further, when the music piece B is changed to the music piece C, ME flag is reversed from “1” to “0”. Accordingly, it is possible to recognize that the broadcast of the music piece B ends, and that broadcast of the music piece C starts since M/S flag remains “01”.

Further, when the broadcast of the music piece C ends, and the broadcast contents returns to speech again, M/S flag changes from “01” to “10”, so that it is possible to recognize that the broadcast contents becomes speech. At the same time, ME flag is reversed from “0” to “1”, so that it is possible to recognize that the broadcast of the music piece C ends.

Figure 5:
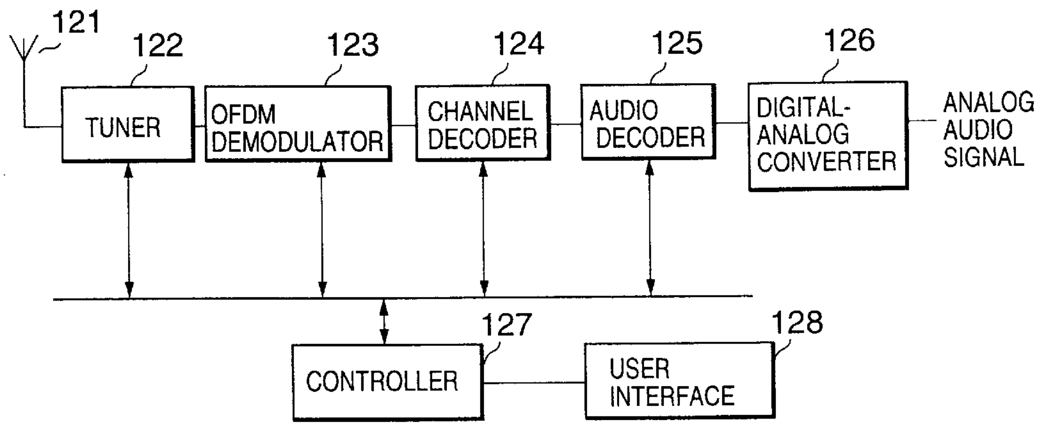
FIG. 5 is a block diagram showing a receiver to which the first embodiment of the present invention is applied.

Next, referring to FIG. 5, there will be described a DAB receiver. In FIG. 5, the DAB receiver comprises an antenna 121, a receiving circuit (tuner) 122, an OFDM demodulator 123, a channel decoder 124, an audio decoder 125, DAC (digital-analog converter) 126, a controller 127, and a user interface 128.

DAB broadcast wave that arrives at the antenna 121 and is received by the receiving circuit 122 is demodulated in OFDM demodulator 123, and, then, decoded in the channel decoder 124 to extract audio signal. The extracted audio signal is decoded in the audio decoder 125 and converted from digital audio signal to analog audio signal in DAC 126.

The controller 127 detects a state of the user interface 128 and recognizes contents of user operation, to control a series of the above-described operation. Further, the controller 127 receives contents of FIC decoded in the channel decoder 124 and contents of PAD decoded in the audio decoder 125 from respective devices, and extracts programme associated information required. Thus, by extracting M/S flag included in PAD, it is possible to recognize whether broadcast contents are music or speech, and by extracting the above-mentioned ME flag, it is possible to recognize that a broadcasted music piece has ended.

By extracting both M/S flag and ME flag, it is possible to recognize a start point and an end point of a music piece being broadcasted.

When the state of M/S flag changes from “10” to “01”, it shows that broadcast contents change from speech to music, and, at the same time, that broadcast of a music piece is started. Conversely, when its state changes from "01" to "10", it shows that broadcast contents change from music to speech, and, at the same time, that broadcast of a music piece ends.

Accordingly, when M/S flag is kept "01" and the logic of ME flag is reversed, it shows that a music piece being broadcasted will end and broadcast of another music piece will start. Accordingly, for a plurality of music pieces which are successively broadcasted, it is possible to recognize a start point and an end point of broadcast of each music piece.

Next, referring to FIG. 6, there will be described a recording system in the present embodiment. This recording system utilizes the above-mentioned ME flag to be adapted for recording music pieces broadcasted in DAB broadcasting.

Figure 6:
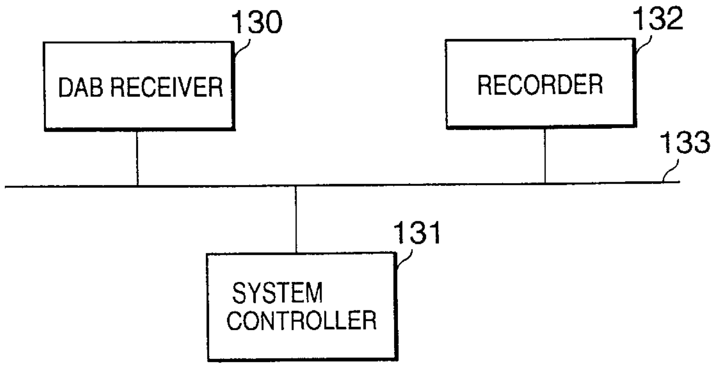
FIG. 6 is a system configuration showing a recording system to which the first embodiment of the present invention is applied.

In FIG. 6, the recording system comprises a DAB receiver 130, a system controller 131, a recorder 132, and a control bus 133.

The DAB receiver 130 is for receiving DAB broadcasting.

The system controller 131 performs system control of the recording system.

As the recorder 132, an MD recorder using a magneto optical disk as a recording medium may be used, for example.

The control bus 133 is for controlling respective devices. When broadcast wave received by the DAB receiver 130 is recorded by the recorder 132, operation of a user is directed to the system controller 131, and the system controller 131 performs operation control such as start and stop of recording for the recorder 132.

Figure 7:
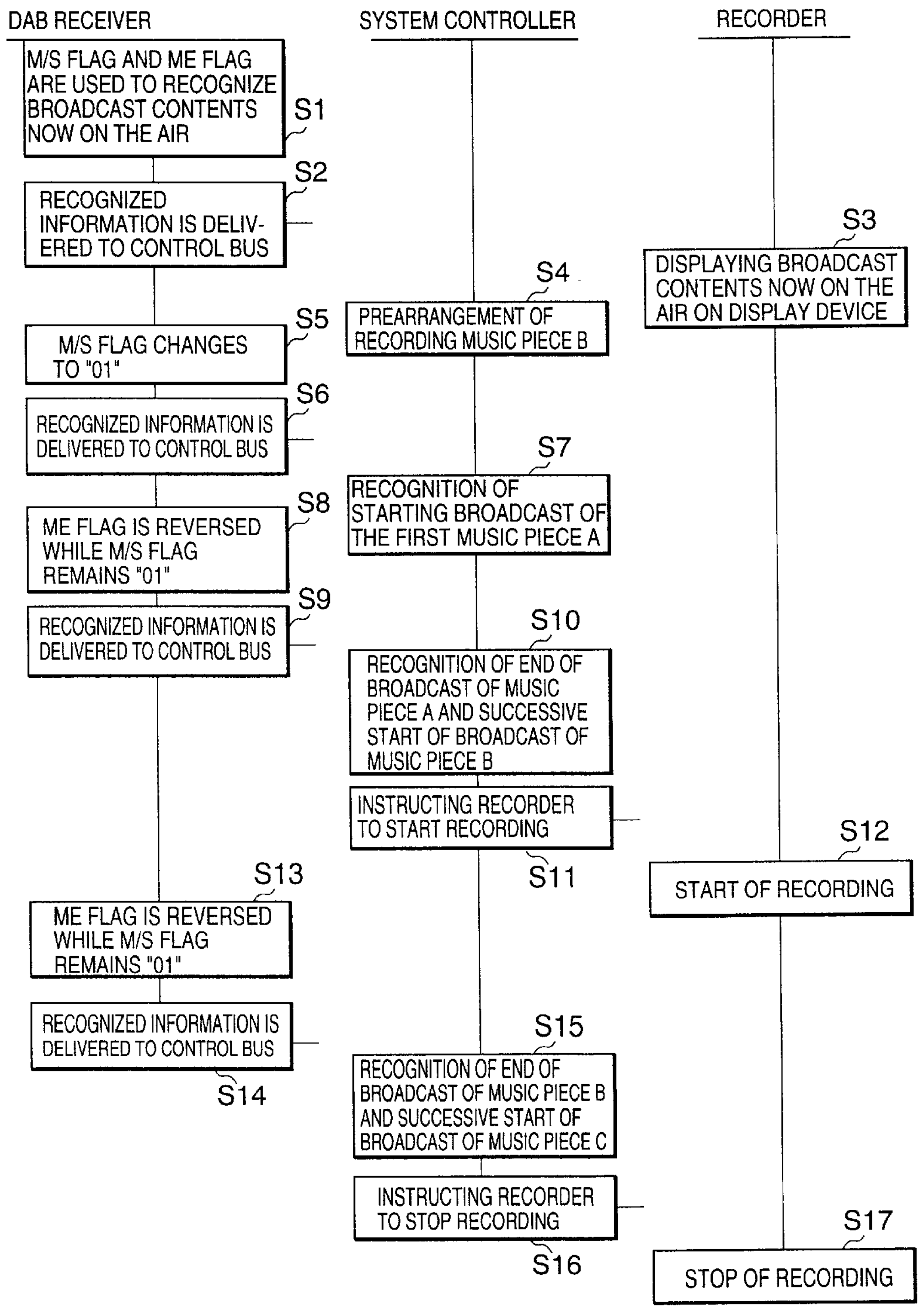
FIG. 7 is a flowchart showing processing for recording only a particular piece of music out of plural pieces of music broadcasted in certain programme.

Here, referring to FIG. 7, there will be described a procedure for recording a particular piece of music out of some pieces of music to be broadcasted in certain programme.

First, DAB receiver 130 recognizes broadcast contents now on the air, by using M/S flag and ME flag (S1).

Information indicating the above-mentioned recognized broadcast contents is transferred to the system controller 131 and the recorder 132, through the control bus 133 (S2).

In the case that the recorder 132 is provided with some display device, it is possible to display the broadcast contents now on the air on that display device (S3).

Figure 4:
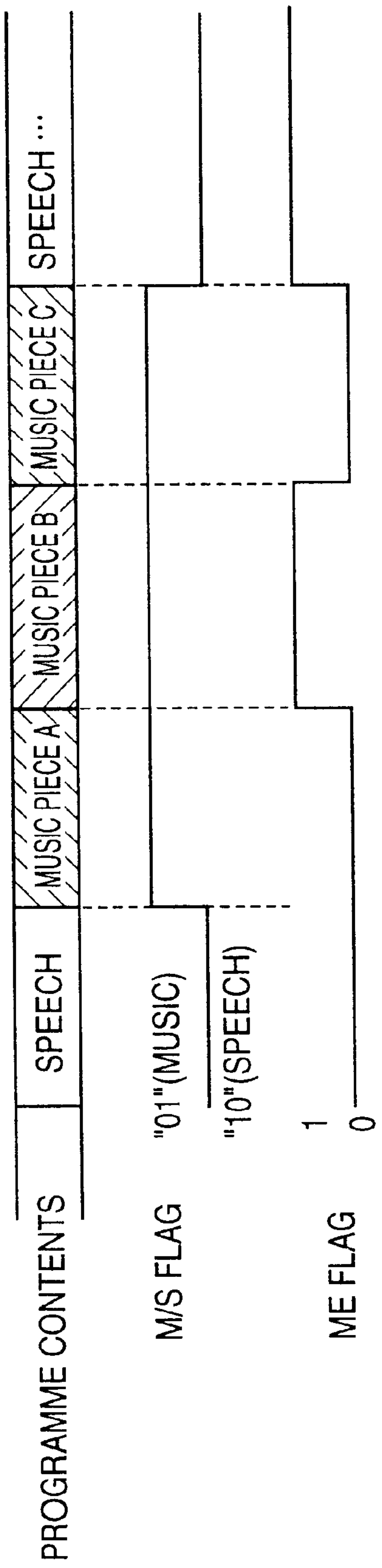
FIG. 4 is a time chart showing an example of contents of M/S flag and ME flag in the case that a music piece A, a music piece B, and a music piece C are successively broadcasted after speaker's speech in a sound programme.

Here, it is assumed that a user wishes to record only music piece B out of the broadcast contents illustrated in the example of FIG. 4. When an operation of record prearrangement of the music piece B is carried out on the system controller 131 (S4), the system controller 131 gives operating instructions to the recorder 132 depending on contents of M/S flag and ME flag transferred from DAB receiver 130.

When M/S flag changes from "10" to "01" (S5) and is transferred through the control bus 133 (S6), the system controller 131 can recognize that broadcast of the first music piece A has been started (S7).

Next, while M/S flag remains "01", ME flag is reversed (S8) and transferred through the control bus 133 (S9). By this, it is possible to recognize that the broadcast of the music piece A ends and, successively, broadcast of the music piece B is started (S10).

When the broadcast of the music piece B whose recording is prearranged is started, the system controller 131 instructs the recorder 132 to start recording, through the control bus 133 (S11). The recorder 132 receives the instruction from the system controller 131 and starts to record the music piece B (S12).

Next, when ME flag is reversed while M/S flag remains "01" (S13), and it is transferred through the control bus 133 (S14), it is possible to recognize that the broadcast of the music piece B ends and, successively, broadcast of the music piece C starts (S15).

Since the broadcast of the music piece B whose recording was prearranged has ended, the system controller 131 instructs the recorder 132 to stop recording, through the control bus 133 (S16). On receiving the instruction from the system controller 131, the recorder 132 stops recording of the music piece (S17).

In the case that a plurality of music pieces are broadcasted successively, and only particular successive music pieces are wanted to be recorded in the MD, it is, of course, possible to automatically recognize the beginning and end of the particular successive music pieces.

Next, referring to FIG. 1 and FIGS. 8–12, there will be described a second embodiment of the present invention.

In the data multiplex broadcasting system of the present embodiment, number-of-music-pieces information (Number of Music data, referred to as "NM data" in the following) that indicates the number of music pieces successively broadcasted before next speech, is newly added to the information multiplexed and transmitted.

A receiver that can receive the information multiplexed to and transmitted with an ordinary broadcast receives the information and recognizes change in the number of music pieces to be successively broadcasted before the next speech, and thereby can recognize an end time of each of the music pieces to be broadcasted. A point of time at which speech is switched to music can be detected using the above-mentioned M/S flag. In the case that a plurality of music pieces are successively broadcasted, it is possible to use the above-described information to recognize a point of time at which a music piece ends and, at the same time, to recognize a point of time when broadcast of the next music piece is started.

Further, it is possible to recognize how many music pieces remain to be broadcasted.

By transferring this information to an audio recording device connected to the receiver, through the control bus, the audio recording device also can recognize a point of time when the broadcast of the music pieces is started.

Accordingly, when a user prearranges recording of a music piece in a stage before start of broadcasting music pieces, for example, in a stage that the music pieces are being introduced, it is possible that the audio recording device automatically starts recording at the moment that it recognizes the point of time when the music piece starts to be broadcasted, and automatically finishes the recording at the moment that it recognizes the point of time when the broadcast of the music piece ends.

For example, as shown in FIG. 1, in F-PAD type "01" in the data frame of DAB, 4 bits except for M/S flag may be defined as NM data.

Figure 8:
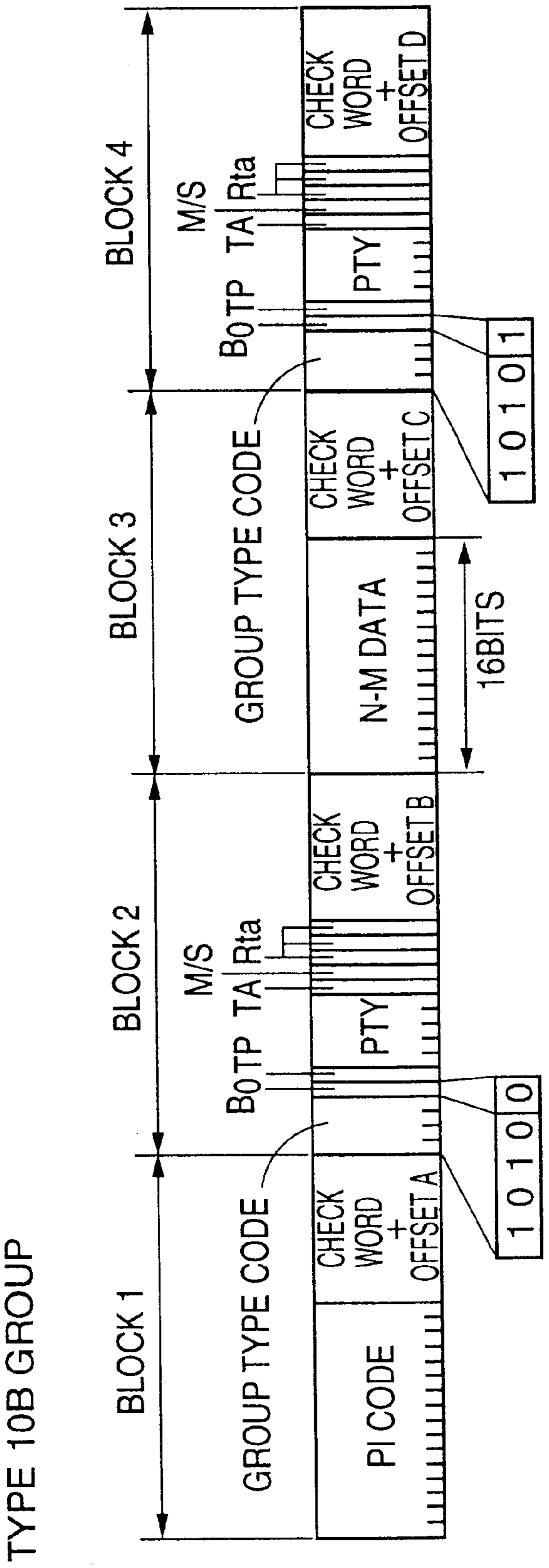
FIG. 8 is an explanatory view showing data structure of RDS signal, to which a second embodiment of the present invention is applied.

Further, as shown in FIG. 8, the upper 16 bits of the block 3 in RDS may be defined as NM data.

Here, application of this information of the number of music pieces is not limited to a remaining number. As a matter of course, information of a number of already broadcasted music pieces, i.e., a number showing order of a currently-broadcasted music piece may be multiplexed to be broadcasted.

Figure 9:
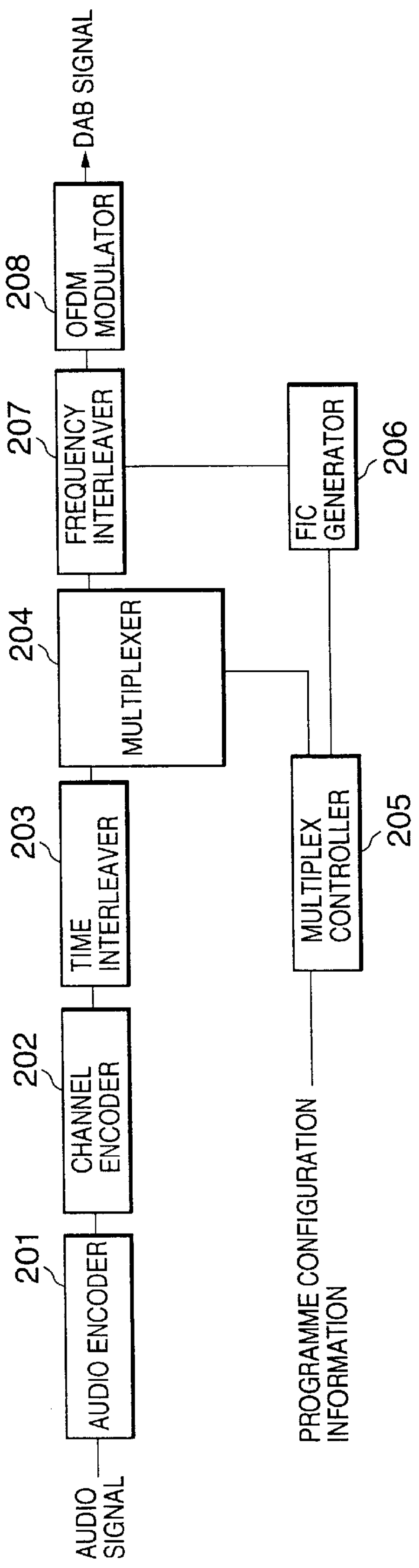
FIG. 9 is a block diagram showing a transmission system to which the second embodiment of the present invention is applied.

Referring to FIG. 9, there will be described a transmission system for applying the present data multiplex broadcasting system to DAB.

In FIG. 9, the transmission system comprises an audio encoder 201, a channel encoder 202, a time interleaver 203, a multiplexer 204, a multiplex controller 205, an FIC (Fast Information Channel) generator 206, a frequency interleaver 207, and an OFDM modulator 208.

An audio signal is processed through the audio encoder 201, the channel encoder 202, the time interleaver 203, and transferred to the multiplexer 204. Programme associated information to be multiplexed to a broadcast passes through the multiplex controller 205, and is usually constructed as FIC in the FIC generator 206, although it may be multiplexed to the audio signal according to its contents. This FIC is added to the audio signal, and thereafter, is subjected to frequency interleave in the frequency interleaver 207, and is subjected to OFDM modulation in the OFDM modulator 208 to be DAB signal. The above-mentioned NM data is incorporated into FIC, and multiplexed to the DAB signal.

Next, referring to FIG. 10, there will be described contents of M/S flag and NM data. Here, the contents of M/S flag and NM data are described using an example in which three pieces of music, A, B, and C are successively broadcasted after speaker's speech in a sound programme of DAB.

When the speaker's speech is on the air, M/S flag is "10", and the broadcast contents can be recognized as speech. NM data represents 3 corresponding to the fact that three music pieces are to be broadcasted.

When the speaker's speech ends and the broadcast of the music piece A starts, M/S flag changes from "10" to "01". Thus, it is possible to recognize that the broadcast contents change to a music piece. NM data becomes 2 to show that two music pieces remain.

Thereafter, when the music piece A is switched to the music piece B, one music piece remains, and, thus, NM data changes from 2 to 1. Accordingly, it is possible to recognize that the broadcast of the music piece A ends, and, since M/S flag remains "01", it is possible to recognize that broadcast of the music piece B is started.

Then, when the music piece B is switched to the music piece C, NM data changes from 1 to 0 to indicate that the broadcast will return to speech after the music piece C. Accordingly, it is possible to recognize that the broadcast of the music piece B ends, and, at the same time, that broadcast of the music C starts since M/S flag remains "01".

Further, when the broadcast of the music piece C ends and the broadcast contents return to speech again, M/S flag changes from "01" to "10". Accordingly, it is possible to recognize that the broadcast contents become speech and, at the same time, the broadcast of the music C ends.

Next, referring to FIG. 11, there will be described an example in which the NM data is applied to recording a music piece broadcasted in DAB broadcasting.

Figure 11:
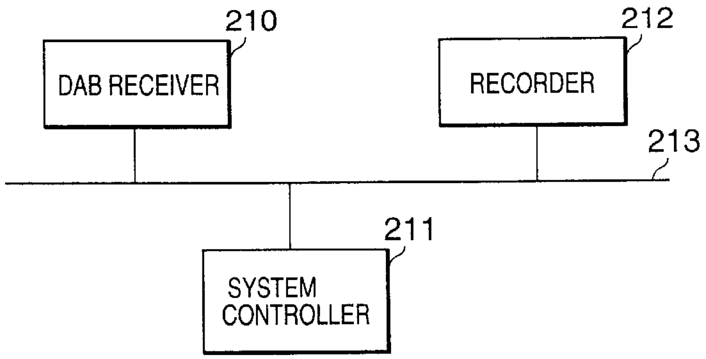
FIG. 11 is a block diagram showing a recording system to which the second embodiment of the present invention is applied.

In FIG. 11, a recording system comprises a DAB receiver 210, a recorder 212, a system controller 211, and a control bus 213 for connecting them.

The DAB receiver 210 is for receiving DAB broadcasting.

The system controller 211 is for performing system control of the recording system.

The recorder 212 is for recording broadcast contents received by the DAB receiver 210. As the recorder 212, an MD recorder using a magneto optical disk as a recording medium may be used, for example.

The control bus 213 is for controlling respective devices.

When broadcast wave received by the DAB receiver 210 is recorded in the recorder 212, user operation is directed to the system controller 211, and the system controller 211 gives operating instructions to the recorder 212.

Figure 12:
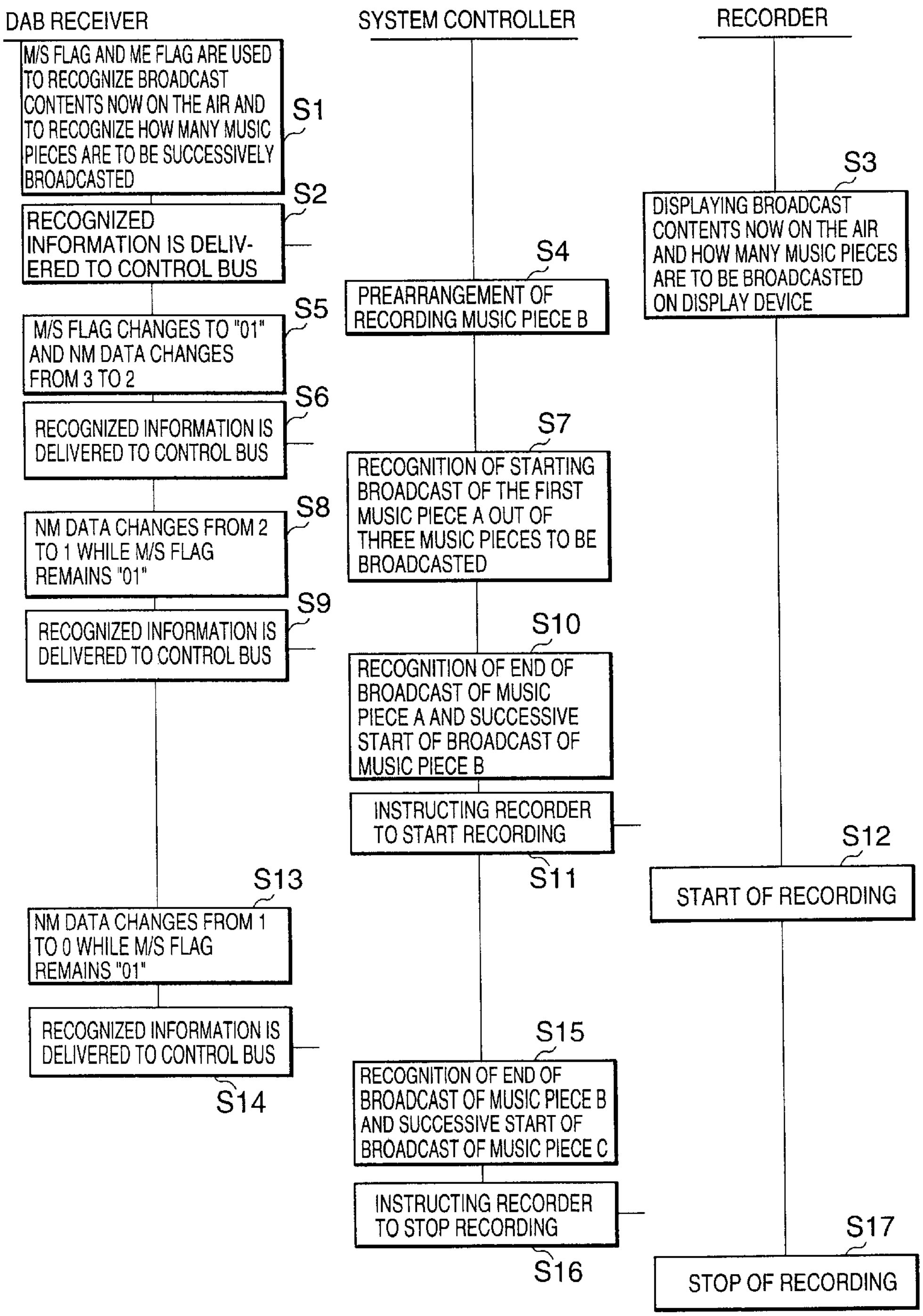
FIG. 12 is a flowchart showing a procedure for recording a particular piece of music out of plural pieces of music broadcasted in certain programme.

Here, referring to FIG. 12, there will be described an example in which a particular music piece out of some pieces of music is to be recorded in the recorder 212.

First, from M/S flag and NM data, the DAB receiver 210 can recognize what is the broadcast contents now on the air and can recognize how many music pieces are to be successively broadcasted (S1). This information is transferred to the system controller 211 and the recorder 212 through the control bus 213 (S2). In the case that the recorder 212 is provided with some display device, it is possible to display the broadcast contents now on the air and how many music pieces are to be broadcasted on that display device (S3). The user can recognize how many music pieces are to be broadcasted from now on, through that display device.

Figure 10:
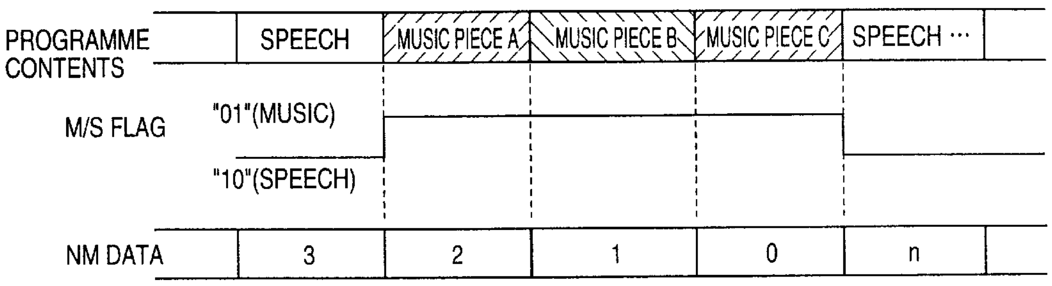
FIG. 10 is a time chart showing states of M/S flag and NM information, showing state change in the case that a music piece A, a music piece B, and a music piece C are successively broadcasted after speaker's speech in a sound programme.

Here, there will be expressed a case that the user wishes to record only the music piece B out of the broadcast contents illustrated in the example of FIG. 10. When prearrangement of recording the music piece is performed through the system controller 211 (S4), the system controller 211 gives operating instructions to the recorder 212 depending on the contents of M/S flag and NM data from the DAB receiver 210.

When M/S flag changes from "10" to "01" and NM data changes from 3 to 2 (S5), and this information is transferred through the control bus 213 (S6), the system controller 211 can recognize the start of broadcast of the first music piece A out of three to be broadcasted (S7).

Next, when NM data changes from 2 to 1 while M/S flag remains "01" (S8), and it is transferred through the control bus 213 (S9), it is possible to recognize that the broadcast of the music piece A ends and, successively, broadcast of the music piece B is started (S10).

Since the broadcast of the music piece B whose recording has been prearranged is started, the system controller 211 instructs the recorder 212 to start recording, through the control bus 213 (S11). On receiving the instruction from the system controller 211, the recorder 212 starts to record (S12).

Next, when NM data changes from 1 to 0 while M/S flag remains "01" (S13) and this information is transferred through the control bus 213 (S14), it is possible to recognize that the broadcast of the music piece B ends and, successively, broadcast of the music piece C is started (S15).

Since the broadcast of the music piece B whose recording has been prearranged ends, the system controller 211 instructs the recorder 212 to stop recording, through the control bus 213 (S16). On receiving the instruction from the system controller 212, the recorder 212 stops recording (S17).

Here, it is obvious that, when a plurality of music pieces are successively broadcasted, and only two or more successive music pieces out of the music pieces are recorded by the recorder, it is possible to automatically recognize the beginning and end of the two or more successive music pieces.

Next, referring to FIG. 13, there will be described a third embodiment of the present invention.

Figure 13:
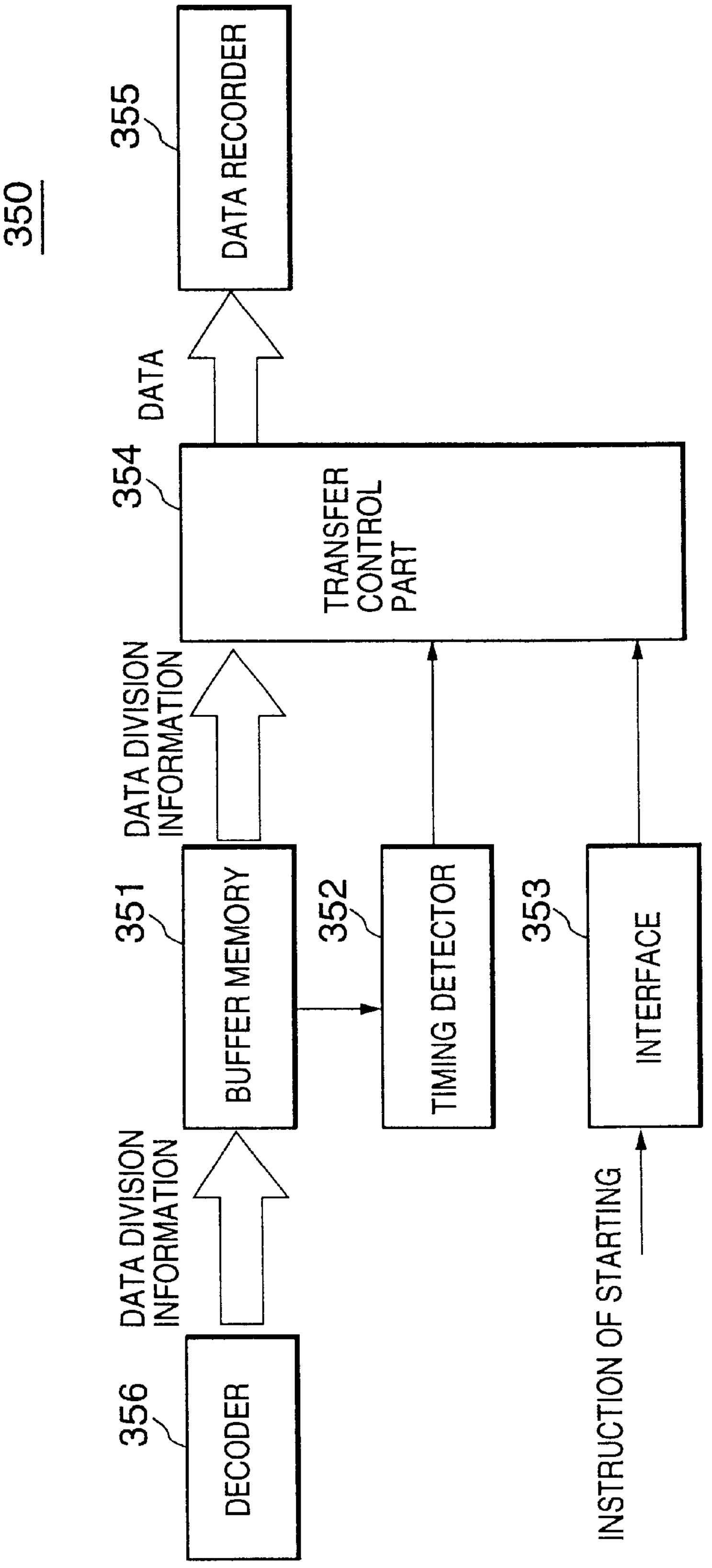
FIG. 13 is a block diagram showing a recording device to which the present invention is applied.
Figure 14:
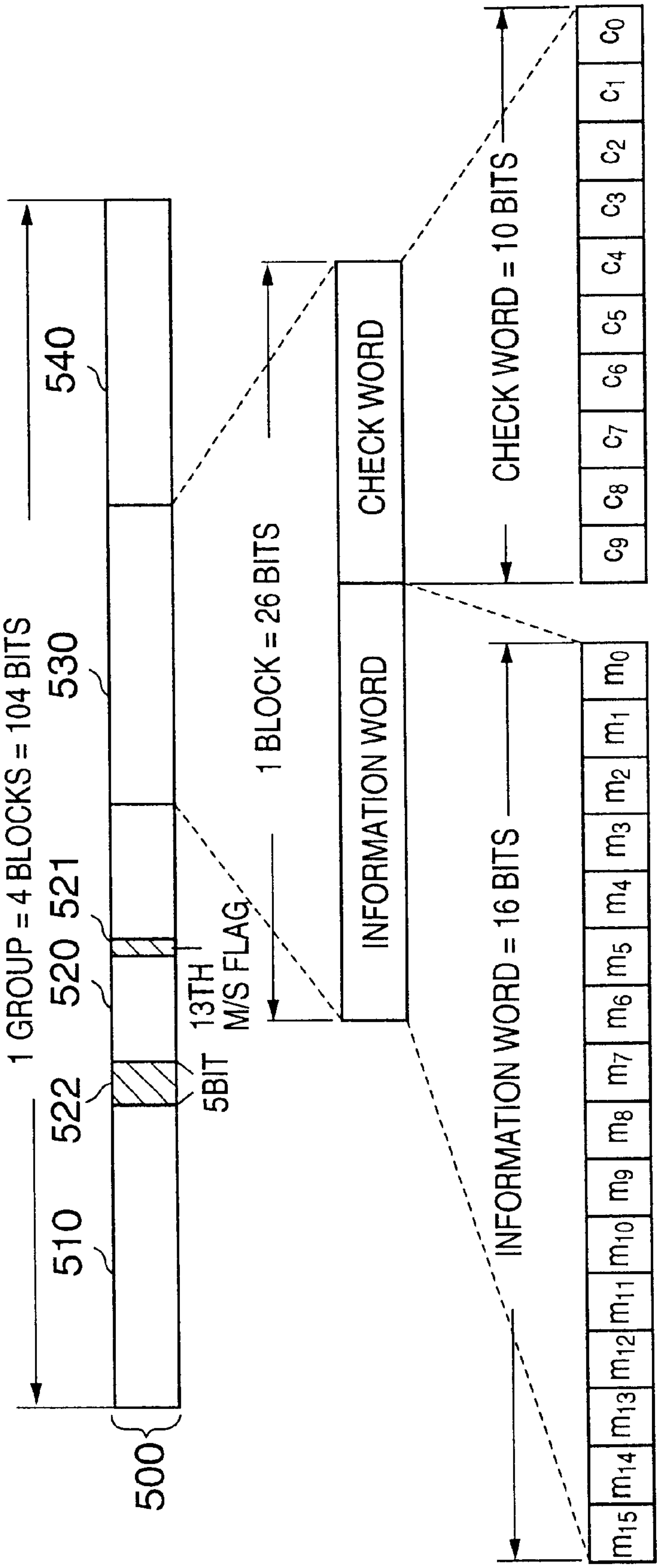
FIG. 14 is an explanatory view showing structure of data multiplexed as RDS signal.

In FIG. 13, a recording device 350 comprises a buffer memory 351, a timing detector 352, an interface 353, a transfer control part 354, a data recorder 355, and a decoder 356.

The interface 353 is for receiving an instruction to start recording.

The decoder 356 is for multiplex decoding of multiplex signal and supplied thereto for extracting contents-expressing data and a divisional signal on the contents of the contents-expressing data from the received data multiplex signal. In the case that the contents-expressing data and the divisional signal on the contents of said contents-expressing data are supplied separately, it suffices that the decoder is provided with a function of decoding the data.

The buffer memory 351 is for storing the extracted contents-expressing data and division signal over a certain period.

The timing detector 352 is for detecting a point of time at which a state of the division signal stored in the buffer memory 351 changes.

The data recorder 355 is for recording the data.

The transfer control part 354 is for controlling data transfer from the buffer memory 351 to the data recorder 355. When the interface 353 receives an instruction of start of recording, the transfer control part 354 transfer the data stored in the buffer memory 351 since the point of time at which a state of the divisional signal changes, to the data recorder 355, at that point of time being detected by the timing detector 352.

By this, in the case that the buffer memory 351 includes a point of time at which a state of the divisional signal changes, it is possible to go back to that point and to start recording just from that point of time.

Here, a display part may be provided for displaying a time period obtained by subtracting a period elapsed from the detected point of time at which the state of the divisional signal has been changed, from the certain period for which the buffer can store the data. Using this display part, it is possible to display a residual quantity of the buffer memory 351 from the divisional signal, i.e., a residual quantity or capacity of the buffer memory 351 which can be used for recording from the past point of time at which a state of the divisional signal changed.

The above description has been made mainly on the case that the present invention is applied to an audio broadcast. However, as a matter of course, the present invention is not restricted to an audio broadcast, and can be applied to moving picture, data broadcasting, and the like. For example, when applied to television broadcasting, it is possible to record only a particular interval of pictures out of a series of pictures successively broadcasted. Further, it is possible to multiplex and broadcast divisional signal concerning a time domain for broadcasting content elements which are expected to be recorded on the receiving side, such as an access address relating to the programme, in particular, application or reference address information in a programme of mail-order sail or the like. Further, in the case that data such as stock quotations are broadcasted, the present invention can be applied to selecting and recording data of a particular name or issue.

According to the present invention, a receiver able to receive programme associated information or independent information multiplexed to an ordinary broadcast can recognize the number of content elements broadcasted in a broadcast programme, and can recognize a start point and end point of broadcasting a particular content element.

In particular, in the case that music pieces are employed as content elements, it is possible to recognize the number of a series of music pieces successively broadcasted, and to recognize start and end points of particular music piece out of the series of music pieces.

By this, in an acoustic system including an audio recording device such as an MD recorder, it is possible to attain a function of prearranging recording of a particular music piece to be broadcasted in a broadcast programme.

Further, when a plurality of music pieces successively broadcasted are recorded in an MD recorder, it is possible to recognize intervals between the music pieces, and, thus, it is possible to attain a function of automatically separating a track.

Further, in a recording device to which the present invention is applied, it is possible to go back to a point of time at which a state of divisional signal on data contents changed to start to record just from that point of time.

What is claimed is:

1. A method of data multiplex broadcasting, which comprises:

multiplexing data to be transmitted, a first code that changes its state in synchronism with starts and ends of a series of content elements represented by said data, and a second code that changes its state in synchronism with a divisional point between said content elements, and wherein said series of content elements includes a plurality of successive content elements belonging to a same category; and broadcasting said data and said codes which are multiplexed.

2. A method of data multiplex broadcasting according to claim 1, wherein said second code represents the number of content elements that have already been transmitted, and wherein the number changes in synchronism with said divisional point.

3. A method of data multiplex broadcasting according to claim 1, wherein said second code represents a remaining number of content elements, wherein the remaining number changes in synchronism with said divisional point.

4. A method of data multiplex broadcasting according to claim 1, wherein said divisional point is obtained by detecting a change of devices that output said content elements.

5. A method of data multiplex broadcasting according to claim 1, wherein said second code is a flag that is reversed in logic in synchronism with the divisional point between said content elements.

* * * * *